(12) United States Patent
Almubarak et al.

(10) Patent No.: US 11,458,419 B2
(45) Date of Patent: Oct. 4, 2022

(54) EMULSION SYSTEM UTILIZING NITROGEN AND HEAT TO TREAT DEEP WATER BLOCKAGE

(71) Applicant: Saudi Arabian Oil Company, Dhahran (SA)

(72) Inventors: Tariq Abdulsattar Almubarak, Dhahran (SA); Ali A. Al-Taq, Eastern Province (SA); Mohammed Khaldi, Eastern Province (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/048,733

(22) Filed: Feb. 19, 2016

(65) Prior Publication Data
US 2016/0244661 A1    Aug. 25, 2016

Related U.S. Application Data

(60) Provisional application No. 62/119,605, filed on Feb. 23, 2015.

(51) Int. Cl.
| | | |
|---|---|---|
| *E21B 43/243* | (2006.01) | |
| *C09K 8/588* | (2006.01) | |
| *C09K 8/70* | (2006.01) | |
| *B01D 17/04* | (2006.01) | |
| *C09K 8/592* | (2006.01) | |
| *C09K 8/74* | (2006.01) | |
| *C09K 8/84* | (2006.01) | |
| *C09K 23/00* | (2022.01) | |

(52) U.S. Cl.
CPC .......... *B01D 17/047* (2013.01); *C09K 8/592* (2013.01); *C09K 8/74* (2013.01); *C09K 8/845* (2013.01); *C09K 23/002* (2022.01)

(58) Field of Classification Search
None
See application file for complete search history.

(56) References Cited

U.S. PATENT DOCUMENTS

| | | |
|---|---|---|
| 4,846,277 A | 7/1989 | Khalil et al. |
| 5,183,581 A | 2/1993 | Khalil et al. |
| 5,580,391 A | 12/1996 | Franco et al. |
| 5,824,160 A | 10/1998 | Khalil et al. |
| 5,891,262 A | 4/1999 | Khalil et al. |

(Continued)

FOREIGN PATENT DOCUMENTS

GB        2276218        9/1994

OTHER PUBLICATIONS

J. P. Ashton et al., SPE Production Engineering; SPE 15660, May 1989, pp. 157-160.*

(Continued)

*Primary Examiner* — Charles R Nold
(74) *Attorney, Agent, or Firm* — Fish & Richardson P.C.

(57) ABSTRACT

Some examples of an emulsion system for treating deep water blockage can be prepared by emulsifying a first aqueous phase in a first organic phase to prepare a first emulsion. A second aqueous phase can be emulsified in a second organic phase to prepare a second emulsion. The first emulsion and the second emulsion can be flowed into a subterranean formation. The first aqueous phase and the second aqueous phase, when mixed, can react to release nitrogen and heat.

18 Claims, 2 Drawing Sheets

(56) References Cited

U.S. PATENT DOCUMENTS

| | | | |
|---|---|---|---|
| 6,035,933 A | 3/2000 | Khalil et al. | |
| 2010/0285999 A1* | 11/2010 | Norman | C09K 8/52 507/240 |
| 2013/0180720 A1* | 7/2013 | Al-Dahlan | E21B 43/166 166/307 |
| 2014/0144632 A1 | 5/2014 | Zavolzhski et al. | |
| 2014/0290951 A1 | 10/2014 | Al-Taq et al. | |

OTHER PUBLICATIONS

Particle Sciences: "Emulsion Stability and Testing," Technical Brief 2011 vol. 2, Jan. 1, 2011, pp. 1-2, <http://www.particlesciences.com/docs/technical_briefs/TB_2011_2.pdf.
International Search Report and Written Opinion issued by the International Searching Authority in Application No. PCT/US2016/018856, dated Jun. 1, 2016.
Chinese Office Action issued in Chinese Application No. 201680011507 dated Apr. 1, 2019, 10 pages.
Gulf Cooperation Council issued in GCC Application No. GC 2016-30899 on Jan. 1, 2019, 4 pages.
Gulf Cooperation Council issued in GCC Application No. GC 2016-30899 on Jul. 29, 2018, 4 pages.
Chinese Office Action issued in Chinese Application No. 201680011507.4 dated Oct. 10, 2019, 14 pages.
Chinese Office Action issued in Chinese Application No. 201680011507.4 dated Jun. 8, 2020, 23 pages, English Translation.
Gulf Cooperation Council issued in GCC Application No. GC 2016-30899 on Nov. 27, 2019, 4 pages.
EPO Communication Pursuant to Article 94(3) EPC issued in European Application No. 16709628.8 dated Jul. 16, 2020, 4 pages.

* cited by examiner

EMULSION SYSTEM UTILIZING NITROGEN AND HEAT TO TREAT DEEP WATER BLOCKAGE

CLAIM OF PRIORITY

This application claims priority under 35 USC §120 to U.S. Patent Application Ser. No. 62/119,605, filed on Feb. 23, 2015, the entire contents of which are hereby incorporated herein.

TECHNICAL FIELD

This disclosure relates to treating deep water blockage, for example, in a hydrocarbon zone.
by reference.

BACKGROUND

Hydrocarbons (e.g., oil, natural gas, combinations of them or other hydrocarbons) can be produced from a hydrocarbon zone, which can include a formation, a portion of a formation or multiple formations. Sometimes, the region of the hydrocarbon zone surrounding a producing well can develop a condition of reduced permeability that can result in a decrease in production of hydrocarbons from the well. The decrease in permeability can be caused by the accumulation of water in the hydrocarbon zone in the region adjacent the well. The water accumulation can be due to injected water, e.g., from drilling, workover operations, stimulation operations, due to interstitial water gradually appearing around the well or other reasons. Removing the water blockage can allow increased production from the wellbore. Certain water blockage treatments include pumping water-based surfactant fluid treatments into hydraulically fractured gas wells. In such fluid treatments, the damage was pushed deeper to the tighter areas making flow back or productivity improvement difficult.

SUMMARY

This disclosure describes an emulsion system to treat deep water blockage.

Some aspects of the subject matter described here can be implemented as a method. A first aqueous phase is emulsified in a first organic phase to prepare a first emulsion. A second aqueous phase is emulsified in a second organic phase to prepare a second emulsion. The first emulsion and the second emulsion are flowed into a subterranean formation. The first aqueous phase and the second aqueous phase, when mixed, react to release nitrogen and heat.

This, and other aspects, can include one or more of the following features. A quantity of an acid can be emulsified with the first aqueous phase. A quantity of acid can be emulsified with the second aqueous phase. The acid can be hydrochloric acid, formic acid, acetic acid, or other inorganic acid. The concentration of the acid can be between about 1% and 5% by weight. The first aqueous phase can include sodium nitrite brine. The second aqueous phase can include ammonium chloride brine. The first organic phase can include diesel, toluene, xylene, or a mixture thereof. The first organic phase can further include an emulsifier. The ratio of the first aqueous phase to the first organic phase in the first emulsion can be about 70:30 volume percentage. The concentration of the emulsifier can be about 0.6% to about 1.2% of total fluid volume. The second organic phase can include diesel, toluene xylene, or a mixture thereof. The second organic phase can include an emulsifier. The ratio of the second aqueous phase to the second organic phase in the second emulsion can be about 70:30 volume percentage. The concentration of the emulsifier can be about 0.6% to about 1.2% of the total fluid volume. Emulsifying the first aqueous phase in the first organic phase to prepare the first emulsion can include determining the level of emulsification of the first emulsion. Emulsifying the second aqueous phase in the second organic phase to prepare the second emulsion can include determining the level of emulsification of the second emulsion. Determining the level of emulsification of the first emulsion or the second emulsion can include conducting a drop test or a conductivity test. Flowing the first emulsion and the second emulsion into a subterranean formation can include flowing the first emulsion and the second emulsion simultaneously into the subterranean formation. The first emulsion and the second emulsion can be flowed to a portion of the subterranean formation experiencing water blockage. Surfactants can be mixed in the aqueous phase of the emulsions before pumping it to the portion of the subterranean formation experiencing water blockage.

Some aspects of the subject matter described here can be implemented as a method of treating a water-blocked subterranean formation. A first aqueous phase and a second aqueous phase are flowed to a water-blocked portion of a subterranean formation. The first aqueous phase and the second aqueous phase, when mixed, release energy to reduce water blockage in the water-blocked portion. A mixing of the first aqueous phase and the second aqueous phase are delayed until the first aqueous phase and the second aqueous phase reach the water-blocked portion.

This, and other aspects, can include one or more of the following features. To delay the mixing of the first aqueous phase and the second aqueous phase, a first emulsion including the first aqueous phase in a first organic phase can be formed. A second emulsion including the second aqueous phase in a second organic phase can be formed. The first emulsion and the second emulsion can be flowed to the water-blocked portion. The first emulsion and the second emulsion can be broken after the first emulsion and the second emulsion have reached the water-blocked portion. To break the first emulsion, a breaker can be added to the first aqueous phase when forming the first emulsion. The breaker can break the first emulsion. To break the second emulsion, a breaker can be added to the second aqueous phase when forming the second emulsion. The breaker can break the second emulsion.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

This disclosure describes an in-situ energized emulsion system to remove deep water blockage. The nitrogen/heat generating system (N/HGS) can include two water-based brines that, when mixed, react and generate heat and nitrogen. The two brines can be emulsified to propagate into the reservoir, where, upon mixing, the N/HGS can generate large volumes of nitrogen to lift the heavy fluids. In addition, as the reaction between the two brines progresses, heat can be released which can increase the temperature up to about 500° F. The generated heat can reduce the surface tension which can further enhance the lifting and removal of water blockage. In some situations, methanol, a surfactant, combinations of them, and/or other chemicals can be added to the two brines to further lower the surface tension and improve the water blockage treatment. In this manner, the N/HGS system described here can instantaneously generate nitrogen and heat upon contact. For example, two salts (described below) with a small amount of catalyst (e.g., hydrochloric acid, organic acids, temperature increase or other catalyst) emulsified in a diesel based layer can be implemented as a water blockage treatment in gas wells to delay the contact and allow deep penetration to the water blocked damage area.

Implementing the emulsion system described here can revive dead wells that have been deeply water-blocked, particularly where other well revival systems have failed or not been significantly successful. Alternatively or in addition, productivity of water-blocked wells can be enhanced by implementing the emulsion system described here.

Figure 1:
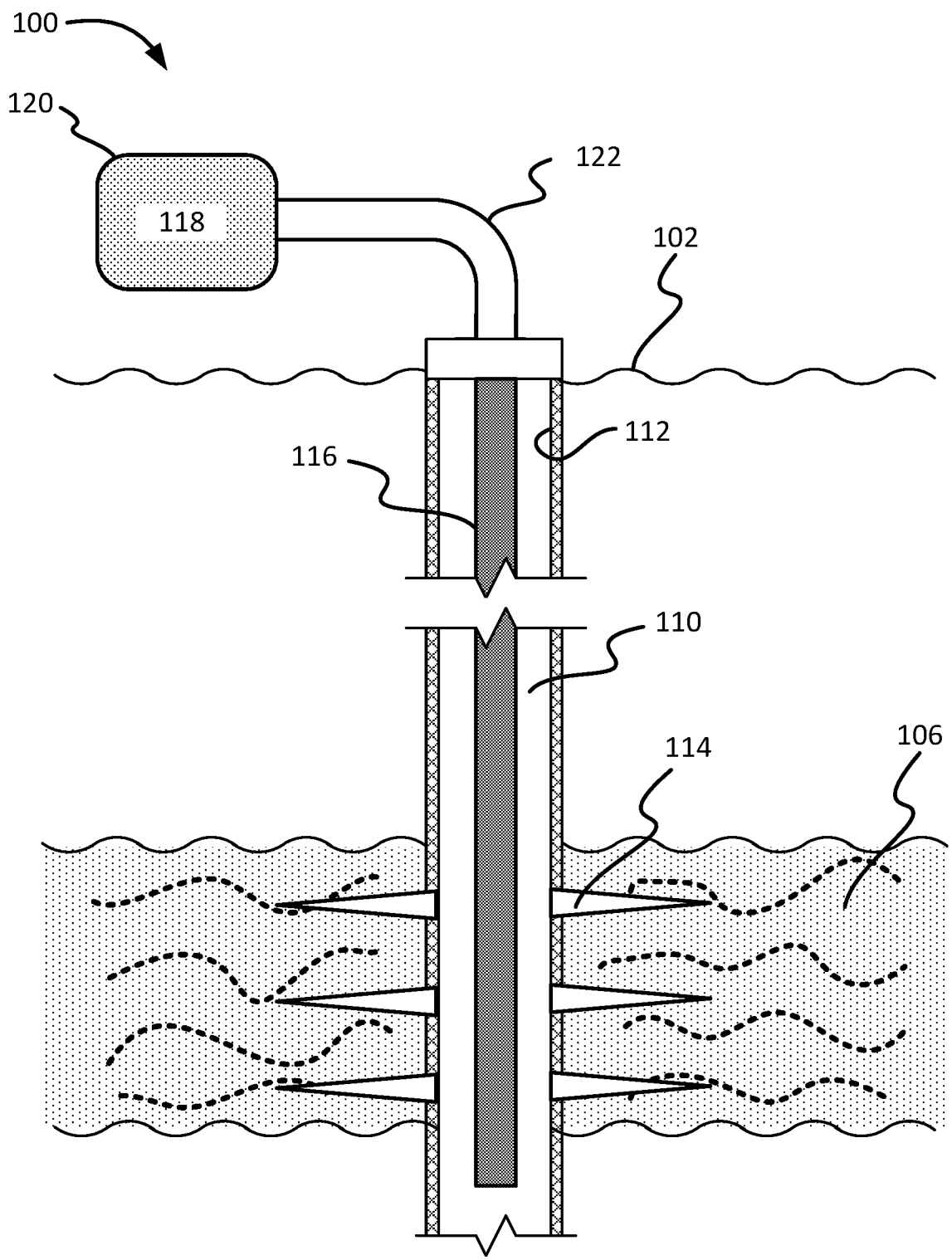
FIG. 1 shows an example well system.

FIG. 1 shows an example well system 100. The well system 100 can flow the emulsion system into a water-blocked portion of a subterranean formation 106, as described below. The example well system 100 includes a wellbore 110 below the terranean surface 102. The example wellbore 110 is cased by a casing 112. A wellbore 110 can include any combination of horizontal, vertical, curved, and/or slanted sections.

The well system 100 includes a working string 116 that resides in the wellbore 110. The working string 116 terminates above the surface 102. The working string 116 can include a tubular conduit of jointed and/or coiled tubing configured to transfer materials into and/or out of the wellbore 110. The working string 116 can be in fluid communication with an emulsion supply 120 that supplies an emulsion system 118 described here. The emulsion supply 120 supplies the emulsion system 118 to the working string 116 via a transfer system 122 of conduits, pumps, piping, and other related equipment. The working string 116 can communicate a fluid such as the emulsion system 118 into or through a portion of the wellbore 110.

Figure 2:
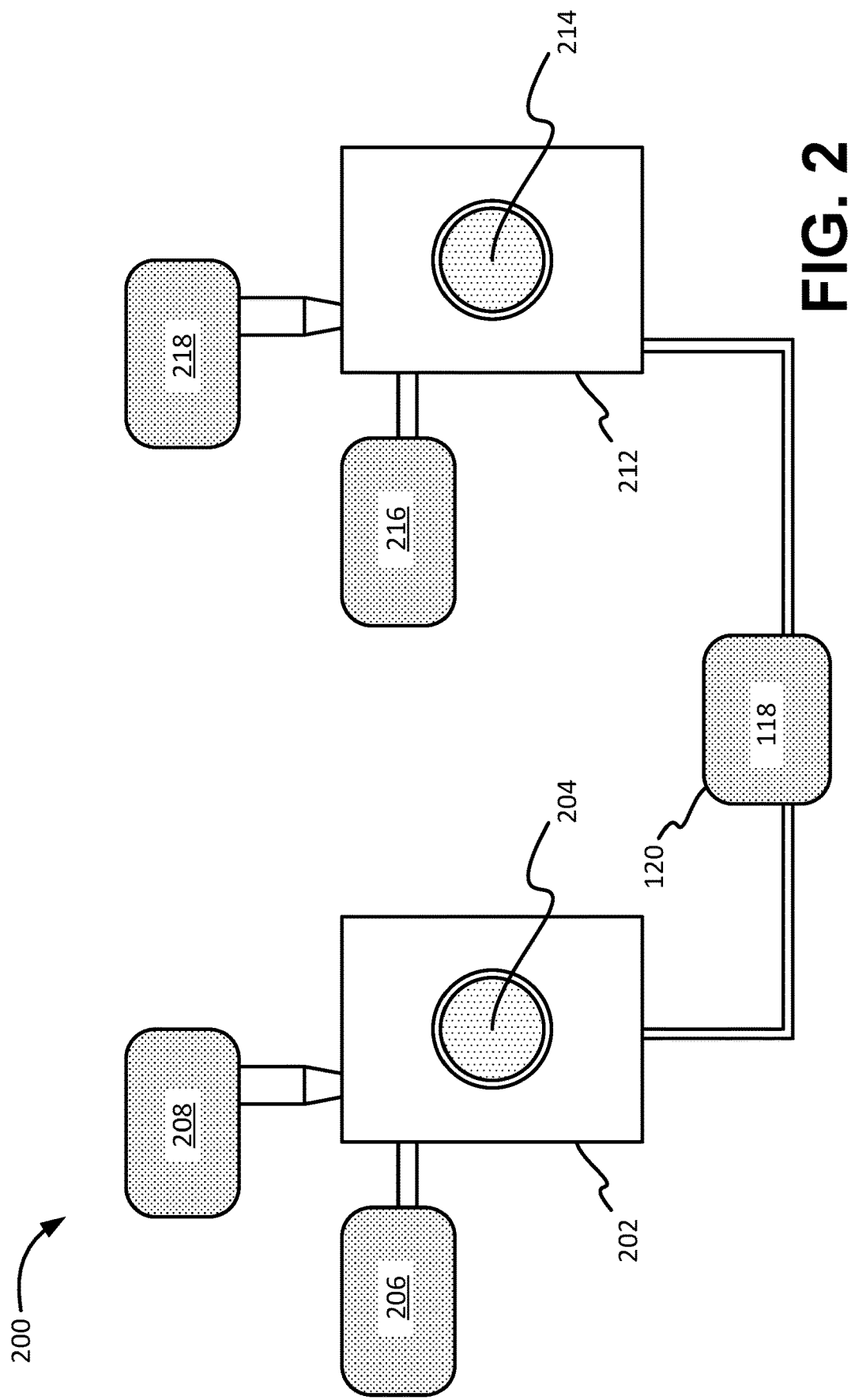
FIG. 2 shows a schematic of an example system for preparing an emulsion system to treat deep water blockage.
Like reference numbers and designations in the various drawings indicate like elements.

FIG. 2 shows a schematic of an example system 200 for preparing an emulsion system to treat deep water blockage. In the system 200, a container 206 can contain a first aqueous phase and a container 208 can contain a first organic phase. For example, the first aqueous phase can include sodium nitrite brine. The first organic phase can include at least one of diesel, toluene or xylene. The volume % ratio between the aqueous phase and the organic phase can be about 70:30. The container 208 can also include a quantity of emulsifier, for example, about 0.6% to about 1.2% of the total fluid volume in the container 208. The emulsifier can include a cationic or amphoteric surfactant. The contents of the container 206 and the container 208 can be poured into the container 202 to form a first emulsion 204 of the first aqueous phase in the first organic phase. In some implementations, a quantity of catalyst can be emulsified to the first aqueous phase. The catalyst can be an acid, for example, hydrochloric acid, formic acid, or acetic acid. A concentration of the catalyst in the emulsion can be about 1% to 5% by weight. The amount of catalyst can influence the release of nitrogen and heat taking place down hole due to dilution. Also, in some implementations, a level of emulsification of the first emulsion can be tested, for example, by performing a drop test, a conductivity test, combinations of them or other techniques.

Also, in the system 200, a container 216 can contain a second aqueous phase and a container 218 can contain a second organic phase. For example, the second aqueous phase can be ammonium chloride brine. The second organic phase can be one of diesel, toluene or xylene. The volume % ratio between the aqueous phase and the organic phase can be about 70:30. The container 218 can also include a quantity of emulsifier, for example, about 0.6% to about 1.2% of the total fluid volume in the container 218. The contents of the container 216 and the container 218 can be poured into the container 212 to form a second emulsion 214 of the second aqueous phase in the second organic phase. In some implementations, a quantity of catalyst can be emulsified to the first aqueous phase. The catalyst can be an acid, for example, hydrochloric acid, formic acid, or acetic acid. A concentration of the catalyst in the emulsion can be about 1% to 5% by weight. The amount of catalyst can influence the release of nitrogen and heat taking place down hole due to dilution. Also, in some implementations, a level of emulsification of the second emulsion can be tested, for example, by performing a drop test, a conductivity test, combinations of them or other techniques.

The two emulsions can be flowed into the emulsion supply 120 to form the emulsion system 118. The emulsions can be added to a fluid and flowed to the water-blocked portion of a subterranean formation 106. The emulsion system 118 can be flowed to the water-blocked portion of the subterranean formation 106 at a flow rate that is sufficient to penetrate the subterranean formation before the first emulsion or the second emulsion breaks.

Individually, the first aqueous phase in the first organic phase emulsion is unreactive by itself. The second aqueous phase in the second organic phase emulsion is also unreactive by itself. When mixed, the first and second emulsion systems are reactive with minimal reaction speed due to the emulsified fluid property. The two aqueous phases in the emulsion system 118 can deeply penetrate the damaged zones (e.g., water-blocked portion of the subterranean formation 106) due to the emulsified fluid property of minimal contact and slow reaction. If the two aqueous phases were directly injected into the damaged zone, then the two aqueous phases would mix and react to release nitrogen and heat before reaching the damaged zones. In such instances, the water-blockage treatment may not be effective. By emulsifying each aqueous phase into a respective emulsion and flowing the two emulsions to the damaged zones, the reaction of the two aqueous phases to release nitrogen and heat can be delayed.

Over time, the breaker reacts with the organic phase to break open the emulsion. By then, the fluid carrying the two emulsions has deeply penetrated the damaged zone. When the first emulsion and the second emulsion break open, the first aqueous phase and the second aqueous phase mix. The chemical reaction of mixing the two aqueous chemical phases can release large quantities of nitrogen gas and heat which can lift the heavy fluids in the damaged zone, and lower the surface tension, thereby enhancing productivity.

In some implementations, one or more surfactants that can reduce the surface tension of the capillary water blockage can be flowed to the water-blocked portion of the subterranean formation 106. The surfactants can pre-treat the water-blocked portion. Then, the emulsion system 118 can be flowed to the water-blocked portion to produce negative pressure by the generated nitrogen, for example, through nitrogen lift, which will force the water inside the formation to flow through the wellbore.

Thus, in some implementations, a water-blocked subterranean formation can be treated by implementing techniques described here. For example, a first aqueous phase and a second aqueous phase, such as those described above, can be flowed to a water-blocked portion of a subterranean formation. The first aqueous phase and the second aqueous phase, when mixed, can release energy to reduce water blockage in the water-blocked portion. A mixing of the first aqueous phase and the second aqueous phase can be delayed until the first aqueous phase and the second aqueous phase reach the water-blocked portion. To delay the mixing of the first aqueous phase and the second aqueous phase, a first emulsion including the first aqueous phase can be formed in a first organic phase. A second emulsion including the second aqueous phase can be formed in a second organic phase. The first emulsion and the second emulsion can be flowed to the water-blocked portion. The first emulsion and the second emulsion can be broken after the first emulsion and the second emulsion have reached the water-blocked portion. To break the first emulsion, a breaker can be added to the first aqueous phase when forming the first emulsion. To break the second emulsion, a breaker can be added to the second aqueous phase when forming the second emulsion. The breaker can break the emulsion, for example, when the emulsion reaches the vicinity of the water-blocked portion.

Thus, particular implementations of the subject matter have been described. Other implementations are within the scope of the following claims.

The invention claimed is:

1. A method of treating a subterranean formation wherein a portion of the subterranean formation has a water blockage, the method comprising:
   emulsifying a first aqueous phase comprising sodium nitrite in a first organic phase to prepare a first emulsion;
   emulsifying a second aqueous phase comprising ammonium chloride in a second organic phase to prepare a second emulsion;
   wherein either the first emulsion, or the second emulsion comprise hydrochloric acid;
   flowing surfactants to the portion of the subterranean formation experiencing water blockage before flowing the first emulsion and the second emulsion to the portion of the subterranean formation experiencing water blockage; and
   flowing the first emulsion and the second emulsion into the portion of the subterranean formation with the water blockage, wherein the first aqueous phase and the second aqueous phase, when mixed, react to release nitrogen and heat, wherein the nitrogen and heat reduces the water blockage.

2. The method of claim 1, wherein the acid further comprises formic acid, acetic acid, or a mixture thereof.

3. The method of claim 1, wherein the concentration of the acid is between about 1% and about 5% by weight.

4. The method of claim 1, wherein the first organic phase comprises at least one of diesel, toluene, or xylene.

5. The method of claim 1, wherein at least one of the first organic phase or second organic phase further comprises an emulsifier.

6. The method of claim 5, wherein the concentration of the emulsifier is about 0.6% to about 1.2% of total fluid volume.

7. The method of claim 1, wherein the ratio of the first aqueous phase to the first organic phase in the first emulsion is about 70:30 volume percentage.

8. The method of claim 1, wherein the second organic phase comprises at least one of diesel, toluene or xylene.

9. The method of claim 1, wherein the second organic phase further comprises an emulsifier.

10. The method of claim 9, wherein the concentration of the emulsifier is about 0.6% to about 1.2% of total fluid volume.

11. The method of claim 1, wherein the ratio of the second aqueous phase to the second organic phase in the second emulsion is about 70:30 volume percentage.

12. The method of claim 1, wherein emulsifying the first aqueous phase in the first organic phase to prepare the first emulsion further comprises determining the level of emulsification of the first emulsion.

13. The method of claim 12, wherein determining the level of emulsification of the first emulsion comprises conducting a drop test of the first emulsion.

14. The method of claim 12, wherein determining the level of emulsification of the first emulsion comprises performing a conductivity test of the first emulsion.

15. The method of claim 1, wherein emulsifying the second aqueous phase in the second organic phase to prepare the second emulsion further comprises determining the level of emulsification of the second emulsion.

16. The method of claim 15, wherein determining the level of emulsification of the second emulsion comprises conducting a drop test of the second emulsion.

17. The method claim 15, wherein determining the level of emulsification of the second emulsion comprises performing a conductivity test of the second emulsion.

18. The method of claim 1, wherein flowing the first emulsion and the second emulsion into a subterranean formation comprises flowing the first emulsion and the second emulsion simultaneously into a subterranean formation.

* * * * *

UNITED STATES PATENT AND TRADEMARK OFFICE
CERTIFICATE OF CORRECTION

PATENT NO. : 11,458,419 B2  
APPLICATION NO. : 15/048733  
DATED : October 4, 2022  
INVENTOR(S) : Almubarak et al.

Page 1 of 1

It is certified that error appears in the above-identified patent and that said Letters Patent is hereby corrected as shown below:

In the Claims

Column 6, Line 45, Claim 17, after "method" insert -- of --.

Signed and Sealed this
Twenty-seventh Day of June, 2023

Katherine Kelly Vidal
*Director of the United States Patent and Trademark Office*